Sept. 25, 1951 J. VELLINGA 2,569,359
THERMOSTATIC VALVE
Filed July 8, 1948
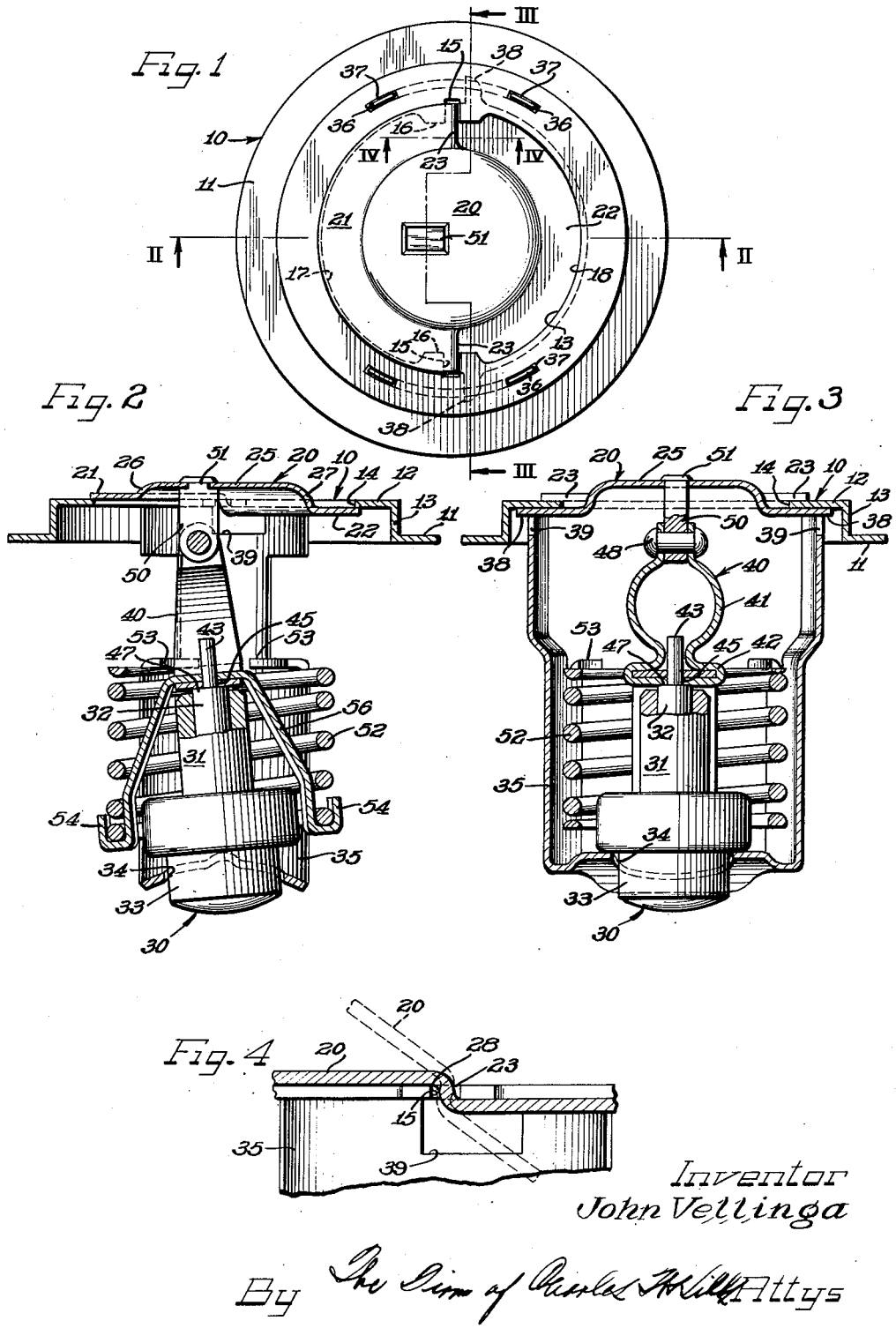
Inventor
John Vellinga
By The Firm of Charles H. Will Attys Patented Sept. 25, 1951

2,569,359

UNITED STATES PATENT OFFICE 2,569,359

THERMOSTATIC VALVE

John Vellinga, Elgin, Ill., assignor to The Dole Valve Company, Chicago, Ill., a corporation of Illinois Application July 8, 1948, Serial No. 37,708

6 Claims. (Cl. 236—34)

This invention relates to improvements in the thermostatic valves. More particularly, this invention has to do with a thermostatic valve in which a shaftless butterfly valve element is used as the closure member of the valve assembly.

It is an object of this invention to provide a thermostatic valve assembly having a butterfly valve which may be adjusted to open at a selected temperature.

It is another object of this invention to provide a thermostatic valve assembly in which a shaftless butterfly valve member is resiliently urged into tight sealing engagement with a valve seat member.

A still further object of this invention is to provide a novel means for holding the butterfly valve in pivoting position during operation of the valve.

A still further object of this invention is to provide a thermostatic valve using a shaftless butterfly type of valve which can be economically fabricated from a metal stamping and which lends itself to economical installation in a flanged connection.

In accordance with the general features of this invention there is provided a valve support member defining an opening in which a shaftless butterfly valve is arranged to pivot for opening and closing of the opening. The valve is normally urged into a closed position by means of a spring acting through a deformable linkage. Opening of the valve is effected through the linkage by the action of a thermo-responsive unit having a piston movable against the linkage.

It is an important feature of this invention to provide a linkage member, the configuration of which may be quickly and easily changed to adjust the clearance between the thermostatic element and the linkage to thus vary the temperature setting at which the valve will open.

Another feature of this invention is the provision of a housing having slots receiving outwardly extending arm members of the valve for limiting the piovting movement of the valve and thus preventing the valve from falling out of the support housing on which it pivots.

Other and further features, objects and advantages of the present invention will be apparent to one skilled in the art from the following detailed description of the attached drawings.

On the drawings:

Figure 1 is a top plan view of the thermostatic valve assembly of the present invention;

Figure 2 is a vertical sectional view taken substantially on line II—II of Figure 1;

Figure 3 is a vertical sectional view taken substantially on the line III—III of Figure 1; and Figure 4 is a fragmentary vertical sectional view taken on line IV—IV of Figure 1, looking in the direction indicated by the arrows.

As shown on the drawings:

In Figures 1, 2 and 3, the reference numeral 10 indicates a valve support member having an outer annular flange 11 and a plate-like element 12 connected by a circular upright wall portion 13. The outer flange 11 provides a mounting surface which may conveniently be clamped between two flanged conduits or passages such as a flanged water outlet connection leading from the engine block of an automobile to the radiator. In this type of installation, the thermostatic valve assembly of the present invention is effective to keep the passage to the radiator closed while the engine is cold and to open the passage as the engine warms up. The plate-like element 12 has an opening 14 therein which is divided into two halves with aligned slots 15—15, Figure 1, formed in diametrically opposite portions 16—16 of edges 17 and 18 which define the opening 13. The slots 15—15 are not only diametrically opposite each other, but are actually disposed in a straight line which defines generally the pivotal area of a valve designated generally by the reference character 20.

The valve 20 comprises two laterally offset planar wing portions 21 and 22 which are connected by intermediate or junction sections 23 at opposite sides thereof, Figure 1, and by an outwardly dished central section 25 which has a transition wall 26, Figure 2, blended into the wing portion 21 and a transition wall 27 blended into the offset wing portion 22. When disposed in operating position in the valve support member 10, the junction sections 23 of the valve 20 are partially within the slots 15—15 of the valve support member 10. An upper edge 28, Figure 4, of the slot 15 provides a knife-like fulcrum on which the valve 20 pivots.

As clearly seen in Figures 1 and 2, the valve 20 is of generally circular configuration. The wing portion 21 is of a diameter to completely overlie the part of the opening 13 defined by line 17 in the support member 10 and the wing portion 22 is of a diameter to close, from the under side, the portion of the opening 13 defined by the line 18. Thus, it will be seen that the peripheral margin of the valve 20 extends beyond the edges of the opening 13 in sealing engagement therewith.

Opening and closing of the valve 20 is effected by means of a typical thermo-responsive element, such as the unit 30, which comprises a casing 31, a piston 32 slidable in the casing and an expansible substance disposed in the casing in communication with the bottom of the piston 32. This expansible substance may suitably be one that will expand or contract due to changes in temperature and which is of such fusible crystalline character that when combined with other materials it will undergo its change of state in the desired temperature range. A well known thermo responsive unit of this type is known as a "vernet" unit.

This type unit has the characteristic of being able to impart a positive, powerful thrust over a limited range as distinguished from a bi-metal thermo-responsive unit which imparts a variable, relatively weak thrust over a wider range.

As the substance in the unit expands due to increased temperature, the piston will be forced outwardly of the casing 31. The casing 31 has a lower cylindrical end portion 33 of reduced diameter extending through a circular aperture 34 in a U-shaped housing member 35 which depends from the valve support member 10 and has four upwardly projecting tabs 36 secured in arcuate slots 37 extending through the plate-like element 12. In assembly, these tabs may be soldered or brazed in place in the slots.

The pivoting movement of the valve 20 is limited by a pair of ear members 38 extending from opposite sides of the valve into slots 39 disposed at the upper end of each arm of the U-shaped housing member 35. As the valve pivots toward opening, the ears 38 contact the bottom of the slots to prevent further opening. The slots 39 are located slightly to one side of each arm member of the housing 35 in order that they will be directly under the ear members 38 which are, as seen in Figure 1, disposed to the right of the pivoting axis of the valve.

To transmit the outward movement of the piston 32 to the valve 20, a lever 40, having an upper open loop 41 and a lower substantially closed loop 42, is arranged to receive an arm member 43, extending away from the piston 32, in an opening 45 in the lower loop 42. The arm 43 is of a smaller diameter than the piston 32 and thus there is provided an annular shoulder 47 which abuts the under side of the loop 42. At its upper end the lever 40 is pivotally connected, as by a rivet 48 to one end of a depending arm 50, the other end of which passes through an opening 51 in the central dished portion 25 of the valve 20 and is secured therein as by peening over the upper edge, and if necessary, by brazing or soldering.

It is to be noted that the depending arm 50 is connected into the valve 20 at a point displaced from the pivoting axis of the valve and is secured in the half of the valve defined by the marginal edge 17 which half overlies the port opening 13. Thus, upward movement of the arm 50 will cause this overlying portion of the valve to swing away from the opening and will cause the other half of the valve to swing downwardly from its position underlying the opening 13.

Since the tab portions 36 of the U-shaped housing 35 are disposed symmetrically about the center of the valve, it is evident that the thermo-responsive units 30 and the lever 40 must be tilted, as shown in Figure 2, in order to contact the offset arm 50.

In its outward movement to open the valve 20, the piston 32 acts against a coil spring 52 which is disposed inside the U-shaped housing 35 abutting at one end against arms 53 extending inwardly from the side of the housing 35 and disposed at the other end in diametrically opposed pockets formed by upstanding flanges 54 at the end of the arm members of a generally U-shaped saddle 56. This saddle 56 passes through the lower loop 42 of the lever 40 and has an opening receiving the arm 43 of the piston 32. Thus, outward movement of the piston 32 tends to compress the spring 52. Since the arm 50 must act against the action of the spring 52 to open the valve, it is evident, of course, that the spring at all times tends to urge the valve member 20 tightly against its seat.

Opening of the valve 20 will not take place until the shoulder 47 of the piston 32 contacts the under side of the lower loop 42 of the lever 40. Therefore, since the outward movement of the piston 32 is a function of the temperature of the fluid surrounding the unit 30, the opening of the valve 20 can be coordinated with the temperature of the fluid, by varying the clearance between the shoulder 47 of the piston 32 and the underside of the loop 42.

This adjustment of the clearance can be quickly and easily made with the apparatus of the present invention by altering the shape of the upper loop 41 to change the effective height of the lever 40.

To calibrate a thermostatic valve, a bath of liquid is prepared at the temperature at which the valve should open. The assembled valve is then put into the bath and allowed to remain there until the thermo-responsive unit 30 has been heated by the bath. The clearance between the shoulder 47 and the loop 42 may then be adjusted until the valve opens under the desired temperature condition.

It is thus seen that in this invention there is provided a thermo-responsive valve member which may be economically manufactured and which lends itself to be inserted in any flanged fluid passageway. Further, there is provided an easy and quick means of setting this thermostatic valve so that the valve will open at any desired temperature.

While I have shown a particular embodiment of my invention, it will, of course be understood that I do not wish to be limited thereto since many modifications may be made and I, therefore, contemplate by the appended claims to cover all such modifications as fall within the true spirit and scope of my invention.

I claim as my invention:

1. A thermostatic valve comprising a housing having a port in one wall, a thermo-responsive unit bottomed on a wall of said housing opposite to said port having a casing containing an expansible substance and a piston slidable in and out of said casing in response to changes in volume of said expansible substance, a valve pivotally mounted for opening and closing said port, and a linkage connected to said valve having an open loop portion adjacent one end and a shoulder portion at the other end aligned with said piston for contact thereby as said piston moves out of said casing, said loop portion being deformable for spacing said shoulder from said piston.

2. A thermostatic valve comprising a housing having slot portions on opposite walls, a cover member secured on said housing having a port opening therein, a valve pivotally mounted on said cover member for opening and closing said port opening and having arm members extending into said slots, the bottom of said slots limiting the pivoting movement of said valve, resilient means urging said valve toward closed position and thermo-responsive means associated with said valve for opening it against the action of said spring in response to increases in temperature.

3. A thermostatic valve comprising a housing, a cover member secured on said housing having a port opening therein, a valve pivotally mounted on said cover member for opening and closing said port opening, a thermo-responsive unit in said housing having a casing and a piston movable in and out of said casing, a linkage secured at one end to said valve and having a flattened loop portion affording an abutment surface at the other end aligned with said piston, arm members extending from said flattened loop, and a spring disposed between said housing and said arm members urging said abutment surface against said piston to hold said valve in closed position.

4. A thermostatic valve comprising a cover plate having a valve port, a valve pivotally mounted in said cover plate for opening and closing said port, a U-shaped housing member having arm portions secured in said cover plate, a thermo-responsive unit bottomed in the bight of said U-shaped member for pivotal movement and having a casing and a piston member movable outwardly of said casing upon increases of temperature in said unit, a linkage pivotally mounted on said valve and having a surface in the path of travel of said piston for contact thereby as it moves outwardly of said casing for opening said valve and a spring mounted between said U-shaped housing and a saddle member secured to said linkage for urging said valve into a closed position.

5. A thermostatic valve comprising a housing having a port opening therein, a valve pivotally mounted in the housing for opening and closing said port, a thermo-responsive unit supported adjacent said valve having a casing and a piston movable in and out of said casing in response to changes of temperature, a linkage pivotally mounted on said valve having an end arranged to be contacted by said piston as it moves out of said casing, and a member for pivotally mounting said thermo-responsive unit comprising a U-shaped housing having an aperture freely receiving the casing of said unit, a saddle member connected to said linkage and having projecting flanges, and a spring disposed around said unit between said housing and the flanges of said saddle.

6. In a thermostatic valve of the type having a shaftless butterfly valve pivotally supported by a housing having a port opening to be controlled and receiving said valve, the improvement of a housing having a seating portion, a thermostatic control device having a casing pivotally rockable on said seating portion and a member movable in and out of said casing in response to temperature variations, a pivotal driving connection between said movable member and said shaftless butterfly valve to angularly position said valve in said port opening thermostatically, and a coiled control spring bottomed against said housing and surrounding said casing of said thermostatic control device and arranged to impart a bias to said driving connection, thereby to urge said valve in one direction and to seat said thermostatic control device.

JOHN VELLINGA.

REFERENCES CITED

The following references are of record in the file of this patent:

UNITED STATES PATENTS

| Number | Name | Date |
| --- | --- | --- |
| 802,110 | Peterman | Oct. 17, 1905 |
| 1,607,745 | Palm | Nov. 23, 1926 |
| 2,265,586 | Vernet | Dec. 9, 1941 |